(12) United States Patent
Hesler et al.

(10) Patent No.: US 7,338,988 B2
(45) Date of Patent: Mar. 4, 2008

(54) AQUEOUS INKJET INK COMPOSITION

(75) Inventors: Carl Michael Hesler, New Egypt, NJ (US); Eric Alvin Johnson, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 202 days.

(21) Appl. No.: 10/699,900

(22) Filed: Nov. 3, 2003

(65) Prior Publication Data

US 2004/0092623 A1    May 13, 2004

Related U.S. Application Data

(60) Provisional application No. 60/425,516, filed on Nov. 12, 2002.

(51) Int. Cl.
*C09D 11/00* (2006.01)

(52) U.S. Cl. ............ 523/160; 523/161; 106/31.6; 524/556

(58) Field of Classification Search ........ 523/160, 523/161
See application file for complete search history.

(56) References Cited

U.S. PATENT DOCUMENTS

| | | | | |
|---|---|---|---|---|
| 4,248,636 A * | 2/1981 | Sasaki et al. | ........ | 106/31.57 |
| 4,849,286 A * | 7/1989 | Milne | ........ | 428/336 |
| 5,085,698 A * | 2/1992 | Ma et al. | ........ | 524/388 |
| 5,221,334 A | 6/1993 | Ma et al. | ........ | 524/167 |
| 5,560,770 A * | 10/1996 | Yatake | ........ | 106/31.43 |
| 5,814,685 A * | 9/1998 | Satake et al. | ........ | 523/201 |
| 5,852,075 A * | 12/1998 | Held | ........ | 523/161 |
| 5,889,083 A * | 3/1999 | Zhu | ........ | 523/161 |
| 5,942,560 A | 8/1999 | Idogawa et al. | ........ | 523/161 |
| 5,965,634 A | 10/1999 | Idogawa et al. | ........ | 523/161 |
| 5,977,210 A | 11/1999 | Patel et al. | ........ | 523/161 |
| 6,087,416 A | 7/2000 | Pearstine et al. | ........ | 523/160 |
| 6,224,660 B1 | 5/2001 | Stubbe et al. | ........ | 106/31.13 |
| 6,239,193 B1 | 5/2001 | Cheng et al. | ........ | 523/160 |
| 6,426,375 B1 | 7/2002 | Kubota | ........ | 523/160 |
| 6,590,025 B1 * | 7/2003 | Carlson et al. | ........ | 524/507 |
| 6,773,102 B2 * | 8/2004 | Chen et al. | ........ | 347/100 |
| 2002/0107303 A1 * | 8/2002 | Miyabashi et al. | ........ | 523/160 |
| 2004/0063807 A1 * | 4/2004 | Wang et al. | ........ | 523/160 |
| 2004/0122131 A1 * | 6/2004 | Brown et al. | ........ | 523/160 |

FOREIGN PATENT DOCUMENTS

| | | |
|---|---|---|
| EP | 0869 160 A2 | 7/1998 |
| EP | 882771 A | 12/1998 |
| JP | 3643282 | 4/2005 |
| WO | WO03/066752 | 8/2003 |

* cited by examiner

*Primary Examiner*—Bernard Lipman
(74) *Attorney, Agent, or Firm*—Karl Stauss

(57) ABSTRACT

An aqueous inkjet ink composition suitable for printing on a hydrophobic surface such as a vinyl surface including an aqueous emulsion polymer having a glass transition temperature (Tg) of from −40° C. to 150° C.; a pigment; and a water-soluble surface agent is provided. Also provided is a method for providing an image on a hydrophobic surface and the image so provided.

6 Claims, No Drawings

AQUEOUS INKJET INK COMPOSITION

CROSS REFERENCE TO RELATED PATENT APPLICATIONS

This is a non-provisional patent application of co-pending U.S. provisional patent application Ser. No. 60/425,516 filed Nov. 12, 2002.

This invention relates to an aqueous inkjet ink composition. In particular, this invention relates to an aqueous inkjet ink composition suitable for printing on a hydrophobic surface including an aqueous emulsion polymer having a glass transition temperature (Tg) of from −40° C. to 150° C.; a pigment; and a water-soluble surface agent. The invention also relates to a method for providing an image on a hydrophobic surface including jetting the ink composition onto the hydrophobic surface; and drying, or allowing to dry, the ink composition. Further the invention relates to an image on a hydrophobic surface formed by the method.

This invention particularly relates to an aqueous inkjet ink composition suitable for printing a durable image on the surface of a hydrophobic substrate without the need for additional processing such as, for example, lamination, pretreatment of the surface, and the application of an overprint varnish or other coating. Such images can be effective for many uses, but are particularly suited for labeling, banners, point of sale advertising, advertising posters, bus wraps, billboards and other durable print uses. The printed images are typically useful in a variety of format sizes ranging from, for example, small format, desktop printing of labels, wide format printing of banners or posters, to grand format printing of billboards.

In inkjet printing the aqueous ink is ejected in the form of droplets from a small orifice by an electronic signal which stimulates a pulse formed either thermally (thermal) or mechanically (piezo, continuous). As the response to this pulse, the ink ejects from the nozzle forming a droplet which is propelled to a specific position on the substrate surface. Once on the surface, this droplet must retain its position and dimensions sufficiently to form the image with adequate resolution after which the droplet must dry and adhere sufficiently to the surface. It is difficult to adhere an image to a hydrophobic surface with an aqueous ink; it is known to pre-treat the surface by coating it with an inkjet receptive layer prior to formation of the image. While such a coating can improve image quality and adhesion to the surface, the coating will increase the cost of the substrate and can decrease the water resistance of the image.

U.S. Pat. No. 6,087,416 discloses an inkjet ink composition suitable for use in printing directly to hydrophobic substrates, the ink including an aqueous vehicle, an insoluble colorant, a polymeric dispersant, a silicon or fluorinated surfactant, and, optionally, a graft copolymer binder which is soluble in the aqueous vehicle. However, since the graft copolymer binder is soluble in the aqueous vehicle of the ink, the molecular weight and level of the graft copolymer binder materially affects the ink viscosity; in practice the converse is more relevant, that is, the required low ink viscosity limits the molecular weight and level of the graft copolymer binder. Therefore it is desired to provide an inkjet ink composition containing a aqueous emulsion polymer which is insoluble in the ink vehicle and which is dispersed in the ink vehicle whereby the ink viscosity is relatively unaffected by the molecular weight and level of the polymeric binder component. It has been found that an aqueous inkjet ink composition including an aqueous emulsion polymer having a glass transition temperature (Tg) of from −40° C. to 150° C.; a pigment; and a water-soluble surface agent, meets that need.

In a first aspect of the present invention there is provided an aqueous inkjet ink composition comprising an aqueous emulsion polymer having a glass transition temperature (Tg) of from −40° C. to 150° C.; a pigment; and a water-soluble surface agent.

In a second aspect of the present invention there is provided a method for providing an image on a hydrophobic surface comprising: forming an aqueous inkjet ink composition comprising an aqueous emulsion polymer having a Tg of from −40° C. to 150° C.; a pigment; and a water-soluble surface agent; jetting said ink composition onto said hydrophobic surface; and drying, or allowing to dry, said ink composition.

In a third aspect of the present invention there is provided an image on a hydrophobic surface formed by the method of the second aspect of the invention The aqueous inkjet ink composition of this invention includes an aqueous emulsion polymer. By "aqueous" herein is meant that a medium or single phase including at least 50% water, by weight, based on the weight of the medium is present. The aqueous emulsion polymer is prepared by an emulsion polymerization process and includes at least one copolymerized ethylenically unsaturated nonionic monomer. By "nonionic monomer" herein is meant a monomer which is electrically neutral in the pH range of 1-14. Ethylenically unsaturated nonionic monomers include, for example, (meth)acrylic ester monomers including methyl (meth)acrylate, ethyl(meth)acrylate, butyl (meth)acrylate, 2-ethylhexyl (meth)acrylate, isodecyl (meth)acrylate, lauryl (meth)acrylate, hydroxyethyl (meth)acrylate, and hydroxypropyl (meth)acrylate; (meth)acrylamide, (meth)acrylonitrile; styrene and substituted styrenes; butadiene; vinyl acetate, vinyl butyrate and other vinyl esters; and vinyl monomers such as vinyl chloride, vinylidene chloride. Preferred are all-acrylic and styrene/acrylic polymers. Preferred is a predominantly acrylic aqueous emulsion polymer. By "predominantly acrylic" herein is meant that the polymer contains greater than 50%, by weight, copolymerized units deriving from (meth)acrylic monomers such as, for example, (meth)acrylate esters, (meth)acrylamides, (meth)acrylonitrile, and (meth)acrylic acid. The use of the term "(meth)" followed by another term such as, for example, acrylate or acrylamide, as used throughout the disclosure, refers to both acrylates or acrylamides and methacrylates and methacrylamides, respectively.

In some embodiments the aqueous emulsion polymer contains from 0% to 15%, by weight based on total monomer weight, of a copolymerized monoethylenically-unsaturated acid monomer, based on the weight of the polymer, such as, for example, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl (meth)acrylate, phosphoalkyl (meth)acrylates such as phosphoethyl (meth)acrylate, phosphopropyl (meth)acrylate, and phosphobutyl (meth)acrylate, phosphoalkyl crotonates, phosphoalkyl maleates, phosphoalkyl fumarates, phosphodialkyl (meth)acrylates, phosphodialkyl crotonates, and allyl phosphate.

The aqueous emulsion polymer used in certain embodiments of this invention contains from 0% to 5%, by weight based on monomer weight, copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene.

The glass transition temperature ("Tg" herein) of the aqueous emulsion polymer is from −40° C. to 150° C., preferably from −20° C. to 100° C.; and more preferably from 40° C. to 80° C.; the monomers and amounts of the monomers which are selected to achieve the desired polymer Tg range are well known in the art. "Tg"s used herein are those calculated by using the Fox equation (T. G. Fox, Bull. Am. Physics Soc., Volume 1, Issue No. 3, page 123(1956)). that is, for calculating the Tg of a copolymer of monomers M1 and M2, $$1/Tg(calc.) = w(M1)/Tg(M1) + w(M2)/Tg(M2)$$

,wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

The glass transition temperatures of homopolymers are be found, for example, in "Polymer Handbook", edited by J. Brandrup and E. H. Immergut, Interscience Publishers.

The aqueous emulsion polymer has an average particle diameter from 50 to 1000 nanometers, preferably from 70 to 300 nanometers as determined using a Brookhaven Model BI-90 particle sizer manufactured by Brookhaven Instruments Corporation, Holtsville N.Y., reported as "effective diameter". Also contemplated are multimodal particle size emulsion polymers wherein two or more distinct particle sizes or very broad distributions are provided as is taught in U.S. Pat. Nos. 5,340,858; 5,350,787; 5,352,720; 4,539,361; and 4,456,726.

The polymerization processes used to prepare the aqueous emulsion polymer are well known. Conventional emulsion polymerization surfactants can be used such as, for example, either anionic or nonionic surfactants, or combinations thereof. Useful surfactants include, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. Copolymerizable surfactants can also be used. Preferred polymerizable surfactant monomers are nonylphenoxy propenyl polyethoxylated sulphate (for example as Hitenol from Dai-ichi Corp); sodium alkyl allyl sulphosuccinate (for example as Trem LF-40 from Henkel Corp); ammonium di-(tricyclo(5.2.1.0 2,6) dec-3-en-(8 or 9)oxyethyl) sulfosuccinate; and ammonium di-(tricyclo(5.2.1.0 2,6) dec-3en-(8 or 9) sulfosuccinate. Additionally, the ammonium and metal salts of unsaturated $C_6$ to $C_{30}$ organic acids can be used, alone or in combination with the above surfactants. Examples of these acids are: alpha methyl cinnamic acid, alpha phenyl cinnamic acid, oleic acid, lineolic acid (as described in U.S. Pat. No. 5,362,832), rincinoleic acid, the unsaturated fraction of Tall oil rosin and fatty acids, disproportionated rosin acid, soybean oil fatty acids, olive oil fatty acids, sunflower oil fatty acids, linseed oil fatty acids, safflower oil fatty acids, sorbitan mono-oleate, abietic acid, poly(oxyethylene) sorbitol sesquioleate, and Empol 1010 Dimer Acid. Suitable polymerizable surfactant monomers also include, for example, maleate derivatives (as described in U.S. Pat. No. 4,246,387), and allyl derivatives of alkyl phenol ethoxylates (as described in JP-62227435).The amount of surfactant used is usually 0.1% to 6% by weight, based on the weight of monomer. Alternatively, a protective colloid such as, for example, polyvinyl alcohol, partially acetylated polyvinyl alcohol, hydroxyethyl cellulose, hydroxymethyl cellulose, hydroxypropyl cellulose, poly N-vinyl pyrollidone, carboxymethyl cellulose, and gum arabic, can be used in the emulsion polymerization, either exclusively or in conjuction with a surfactant. The reaction temperature is typically maintained at a temperature lower than 100° C. throughout the course of the reaction. Preferred is a reaction temperature between 30° C. and 95° C., more preferably between 50° C. and 90° C. A thermal or redox initiation process can be used. The monomer mixture can be added neat or as an emulsion in water. The monomer mixture can be added in one or more additions or continuously, linearly or not, over the reaction period, or combinations thereof. Suitable aqueous emulsion polymers are disclosed in EP 1108758 and EP1108759.

Further, a chain transfer agent such as, for example, isopropanol, halogenated compounds, n-butyl mercaptan, n-amyl mercaptan, n-dodecyl mercaptan, t-dodecyl mercaptan, alkyl thioglycolate, mercaptopropionic acid, and alkyl mercaptoalkanoate in an amount of 0 to 5% by weight based on monomer weight is used in certain embodiments to regulate the molecular weight of the aqueous emulsion polymer.

In an alternative embodiment of the present invention the aqueous emulsion polymer is prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer includes certain of the monomers, surfactants, protective colloid, initiation system, chain transfer agents, etc. as exemplified herein-above for the aqueous emulsion polymer. In the case of a multi-staged polymer particle the composition for the purpose of this invention is to be calculated herein using the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373.

The aqueous emulsion polymer can be prepared by batch, semi-batch, gradual addition, or continuous processes, as are well known to those skilled in the art.

The ink composition of the present invention typically includes the aqueous emulsion polymer at a level of 0.1% to 25%, preferably 0.5% to 15%, by weight based on the total weight of the ink composition.

The aqueous inkjet ink composition of this invention includes a pigment. The pigment is alternatively an organic pigment, an inorganic pigment, a organic/inorganic composite pigment, or mixtures thereof. By "organic pigment" herein is meant a pigment which is predominantly an organic compound or mixture of organic compounds, explicitly including carbon black.

Suitable organic pigments include, for example, anthroquinones, phthalocyanine blues, phthalocyanine greens, diazos, monoazos, heterocyclic yellows, pyranthrones, quinacridone pigments, dioxazine pigments, indigo, thioindigo pigments, perynone pigments, perylene pigments, isoindolene, polymer particles having at least one void, and the like. Carbon black is the generic name for small particle size carbon particles formed in the gas phase by the thermal decomposition of hydrocarbons and includes, for example, materials known in the art as furnace black, lampblack, channel black, acetylene black. Carbon black additionally encompasses treated, modified, and oxidized carbon black. Suitable inorganic pigments include titanium dioxide, iron oxide, and other metal powders. Generally, the amount of pigment(s) used is from 1% to 15%, preferably from 2% to 8%, by weight based on the total weight of the ink. The pigment particle size must be sufficiently small that pigment particles will not clog the nozzles on the printing device in which the ink is to be used. Typical nozzle openings on ink jet printers are 10 to 60 microns in diameter. Preferably, the pigment particle size is from 0.02 to 2, more preferably from 0.02 to 1, and most preferably from 0.02 to 0.3 microns in diameter.

The aqueous inkjet ink composition of this invention includes a water-soluble surface agent. By "surface agent" herein is meant a material which interacts with the hydrophobic surface on which the ink composition is suitable for printing. Interaction with the surface is determined by placing a drop of the agent on the surface for one hour under a watch glass at room temperature and, immediately after removing the agent, visually observing the contacted area of the surface. Either surface distortion or loss of gloss, or both, is taken as interaction with the surface and the agent is thereby a surface agent. Preferred water-soluble surface agents are the monoalkyl ethers of certain alkylene glycols, wherein the alkyl is selected from C1-C4 alkyl and the alkylene glycol is selected from mono-, di-, and tri- ethylene glycol and mono-, di-, and tripropylene glycol; 2-pyrol; N-methylpyrollidone; sulfolane; and mixtures thereof. The amount of water-soluble surface agent in the ink is typically from 3% to 30%, preferably from 5% to 20%, and more preferably from 5% to 15%, by weight based on the total weight of the ink.

The aqueous inkjet ink composition of this invention can include a polymeric pigment dispersant. The polymeric pigment dispersant is selected to aid in the dispersion and stabilization of the pigment in order to provide an ink having reliable jetting. Suitable polymeric pigment dispersants include random polymers and block or graft polymers, preferably anionically charged polymers. Such dispersants typically contain hydrophilic and hydrophobic character in the same molecule. In some embodiments a predispersed pigment is used, that is a previously prepared pigment dispersion, preferably an aqueous dispersion, whereby the polymeric pigment dispersant, or alternatively a surfactant, is provided to the inkjet ink composition along with the pigment. The amount of polymeric pigment dispersant, by weight, relative to pigment weight is typically from 1:1 to 1:10.

The inkjet ink composition can include a surfactant which aids in control of droplet formation, surface wetting and coalescence of droplets in the printed image. Anionic and nonionic surfactants are preferred. Typically the amount of surfactant is effective to provide a surface tension of the inkjet ink composition of from 22 dynes/cm to 36 dynes/cm.

The ink composition can also include water-miscible or water-soluble materials such as humectants, chelating agents, defoamers, buffers, biocides, fungicides, viscosity modifiers, bactericides, surfactants, anti-curling agents, anti-bleed agents and surface tension modifiers, all as is known in the art. Useful humectants include ethylene glycol, 1,3 propanediol, 1,4 butanediol, 1.4 cyclohexanedimethanol, 1,5 pentanediol, 1,6 hexanediol, 1,8 octanediol, 1,2 propanediol, 1,2 butanediol, 1,3 butanediol, 2,3 butanediol, diethylene glycol, triethylene glycol, tetraethylene glycol, polyethylene glycol with average molecular weight of 200, 300, 400, 600, 900, 1000, 1500 and 2000, dipropylene glycol, polypropylene glycol with average molecular weight of 425, 725, 1000, and 2000, glycerol, 1,2,6-hexanetriol, sorbitol, 2-pyrrolidone, 1-methyl-2-pyrrolidone, 1-methyl-2-piperidone, N-ethylacetamide, N-methlpropionamide, N-acetyl ethanolamine, N-methylacetamide, formamide, 3-amino-1,2-propanediol, 2,2-thiodiethanol, 3,3-thiodipropanol, tetramethylene sulfone, butadiene sulfone, ethylene carbonate, butyrolacetone, tetrahydrofurfuryl alcohol, glycerol, 1,2,4-butenetriol, trimethylpropane, pantothenol, Liponic EG-1. Preferred humectants are polyethylene glycol with average molecular weight of 200 to 1000, glycerol, 1,2,6-hexanetriol, and sorbitol.

The amount of humectant used in the ink typically ranges from 1% to 30%, preferably from 5% to 15%, by weight, based on the total weight of the ink.

The amount of defoaming agent in the ink will typically range from 0 to 2.0% by weight, based on the total weight of the ink. Defoaming agents useful in forming aqueous dispersions of pigments are well known in the art and commercially available examples include SURFYNOL™ 104E and SURFYNOL™ DF-37 (Air Products Corp., Allentown, Pa.).

The aqueous inkjet ink composition of the invention typically has a viscosity of from 1.5 cps to 60 cps and a preferred viscosity of from 1.5 cps to 5 cps, particularly for certain low energy piezo printing heads.

In the method for providing an image on a hydrophobic surface of the present invention the aqueous inkjet ink composition described herein is jetted onto a hydrophobic surface; and dried, or allowed to dry. The hydrophobic surface used for these applications can be provided in many forms. These include opaque and transparent polyester film or molded polyester such as polyethylene terephthalate, cast vinyl sheet, extruded vinyl sheet, vinyl scrim, and vinyl-coated paper substrates. "Vinyl" herein refers to plasticized or unplasticized polyvinyl chloride, including copolymers or blends thereof In addition, these substrates can have a matte or gloss finish and can be self adhesive free sheets.

The applied ink jet ink composition is dried or allowed to dry. In embodiments where the aqueous emulsion polymers have a Tg higher than ambient, the surface and/or the image rendered upon it can be heated to promote film formation as well as evaporation of the vehicle. In addition to forming the film, the heating also improves fixation of the image improving its resolution, decreases the time required for the image to dry and can enhance the adhesion of the film to the surface. Preferably, the heating can be done on the printer but can also be done in an oven after the printing process is complete. Additional benefits in adhesion and in image quality typically accrue when the surface is preheated before the image droplets are jetted onto the surface.

In alternative embodiments where the aqueous emulsion polymers have a Tg higher than ambient, a coalescent is incorporated into the aqueous inkjet ink composition in order to reduce the film-forming temperature of the polymer and to aid in wetting the surface.

Test Methods used in the Examples:

Print Method

Print tests were conducted on an HP 890 or a Lexmark 2070 using the black cartridge printhead. The surface was a glossy self-adhesive backed vinyl from Avery, model number MP1005. Samples were dried in an oven at 150° C. for 1 minute before testing.

Abrasive Adhesion Test Method

Crock-o-meter test unit, 2500 grit sand paper, 10 cycles, measured differences in O.D. before and after the crock test.

Scratch Adhesion Test Methods

Adhesion of the ink was tested by rubbing the cured ink with a tissue using moderate pressure. The adhesion was qualitatively rated by examining the amount of ink transferred to the tissue and the amount of ink smeared to adjacent non-printed areas. The adhesion was further tested by scratching the image with a fingernail with moderate pressure.

EXAMPLES 1-3

Inkjet Ink Compositions and Evaluation

The following ingredients were mixed together in the order given.

|  | EXAMPLE | | |
| --- | --- | --- | --- |
|  | 1 | 2 | 3 |
| N-Methyl pyrrolidone | 5.8 | 5.3 | 8.0 |
| Polyethylene glycol | 1.8 | 3.3 | 5.2 |
| Ethylene glycol | 1.8 | 1.7 | 2.8 |
| SURFYNOL ™ 104E | 0.7 | 0.7 | 0.8 |
| DS-4 | 1.3 | 1.3 | 1.6 |
| ACRYJET ™ 357 | 22.5 | 20.7 | 30.0 |
| Deionized water | 36.1 | 32.0 | 126.6 |
| Emulsion polymer (Tg = −24° C.) | 30.0 | | |
| Methyl CARBITOL ™ | | 5.0 | 4.0 |
| Emulsion polymer (Tg = 60° C.) | | 30.0 | 50.0 |
| ZONYL ™ FSH | | | 3.0 |

Note:
SURFYNOL ™ is a trademark of Air Products Co., Allentown, PA;
ACRYJET ™ is a trademark of Rohm and Haas Company, Philadelphia, PA;
CARBITOL ™ is a trademark of Union Carbide Corp., Danbury, CT;
ZONYL ™ is a trademark of DuPont Chemicals Co., Wilmington, DE.

TABLE 1.1

Evaluation of adhesion in prints of Examples 1-3

| EXAMPLE | Tissue rub resistance | Fingernail scratch test |
| --- | --- | --- |
| 1 | good | Failed; ink peeled from surface |
| 2 | good | Very resistant to scratch |
| 3 | good | Very resistant to scratch |

The ink of Examples 1-3 of the present invention printed on vinyl exhibited good tissue rub resistance. The ink of Examples 2-3 including an aqueous emulsion polymer having a more preferred Tg also exhibited high resistance in the fingernail scratch test. The ink of Example 3 of the present invention also exhibited good print quality 3-4 (5=best).

EXAMPLES 4-7

Preparation of Inkjet Ink Compositions and Evaluation

The inks of Examples 4-7 were prepared using the ingredients listed below

|  | EXAMPLE | | | |
| --- | --- | --- | --- | --- |
|  | 4 | 5 | 6 | 7 |
| Water | 56.2 | 56.2 | 56.2. | 55.4 |
| Glycerol | 5.0 | 5.0 | 5.0 | 7.5 |
| Ethylene glycol | 2.5 | 2.5 | 2.5 | |
| 2-pyrol | 1.7 | 1.7 | 1.7 | 1.7 |
| TEGME | 3.3 | 3.3 | 3.3 | 3.3 |
| DS-4 | 1.3 | 1.3 | 1.3 | 1.3 |
| ACRYJET ™-157 Cyan | 15.0 | | | |
| ACRYJET ™-127 Magenta | | 15.0 | | |
| ACRYJET ™-1547 Yellow | | | 15.0 | |
| ACRYJET ™-357 Black | | | | 15.0 |
| Emulsion polymer (Tg = 60° C.) | 13.3 | 13.3 | 13.3 | 13.3 |
| SURFYNOL ™ 104E | 1.75 | 1.75 | 1.75 | 2.5 |

The inks of Examples 4-7 of the present invention suitable for thermal inkjet printing were printed using an Encad NovaJet 500. These inks have excellent print quality (4-5) and are thermally stable. Uncapped restart of these inks is excellent (2 months in cartridge, out of printer). Adhesion to hydrophobic surfaces is expected to be good.

EXAMPLES 8-11

Formation of Inkjet Inks and Piezo Inkjet Printing

|  | Example | | | |
| --- | --- | --- | --- | --- |
|  | 8 | 9 | 10 | 11 |
| Water | 33.1 | 52.1 | 56.4 | 40.8 |
| Glycerol | 10.0 | 1.0 | 1.0 | 1.0 |
| 1,2-6 hexanetriol |  | 4.0 | 4.0 | 4.0 |
| 2-pyrol | 3.4 | 1.7 | 1.7 | 1.7 |
| TEGME | 6.6 | 3.3 | 3.3 | 3.3 |
| DS-4 | 1.3 | 1.5 | 1.5 | 1.5 |
| CH2571 (6:1 K) | 23.1 | | | |
| SunJet ™ cyan | | 13.9 | | |
| SunJet ™ magenta | | | 19.6 | |
| CH2575 (10:1 Y) | | | | 25.2 |
| Emulsion polymer (Tg = 60° C.) | | | | |
| SURFYNOL ™ 104E | | | | |

The inks of Examples 8-11 of the present invention suitable for piezo inkjet printing were printed on an Epson 3000 printer. Print quality was good on glossy vinyl, best on scrim vinyl.

The K, Y, and C inks were stable after they were heat aged for 5 days at 60° C. ("HA PS"). Particle sizes were measured using a MICROTRAC™ UPA-150 Particle size analyzer (Microtrac Co., North Largo, Fla.) as shown in Table 8.1; 100% PS means no particles larger than that size were found.

TABLE 8.1

Stability of inks (particle sizes all in nanometers)

| | Ink of Ex. No. | | | |
|---|---|---|---|---|
| | 8 | 9 | 10 | 11 |
| Particle size | 158 | 192 | 303 | 244 |
| 100% PS | 630 | 750 | 530 | 750 |
| HA PS (5 days) | 165 | 159 | 423 | 260 |
| 100% PS | 630 | 530 | 2120 | 750 |

What is claimed is:

1. A method for providing an image on a hydrophobic surface consisting essentially of:

forming an aqueous inkjet ink composition consisting essentially of an aqueous emulsion polymer having a Tg of from 40° C. to 80° C.; a pigment; a surfactant selected from the group consisting of anionic surfactants, nonionic surfactants, and mixtures thereof; and a water-soluble surface agent;

jetting said ink composition onto said hydrophobic surface; and drying, or allowing to dry, said ink composition.

2. The method of claim 1 wherein said hydrophobic surface comprises polyvinyl chloride.

3. An image on a hydrophobic surface formed by the method of claim 1.

4. The method of claim 1 wherein the water-soluble surface agent is selected from the group of monoalkyl ethers of alkylene glycols, wherein the alkyl is selected from C1-C4 alkyl and the alkylene glycol is selected from mono-, di-, and tri-ethylene glycol and mono-, di-, and tri- propylene glycol; 2-pyrol; N-methylpyrollidone; sulfolane; and mixtures thereof.

5. The method of claim 1 wherein the amount of water-soluble surface agent in the ink is from 5% to 15%, by weight based on the total weight of the ink.

6. The method of claim 1 wherein the amount of surfactant is effective to provide a surface tension of the inkjet ink composition of from 22 dynes/cm to 36 dynes/cm.

* * * * *